April 14, 1953 J. H. BORNZIN 2,634,840
CLUTCH TRIP MECHANISM FOR HAY BALERS
Filed March 28, 1951 7 Sheets-Sheet 6

Inventor:
James H. Bornzin
Paul O. Pippel
Attorney.

Patented Apr. 14, 1953

2,634,840

UNITED STATES PATENT OFFICE 2,634,840

CLUTCH TRIP MECHANISM FOR HAY BALERS

James H. Bornzin, Memphis, Tenn., assignor to International Harvester Company, a corporation of New Jersey Application March 28, 1951, Serial No. 218,050

9 Claims. (Cl. 192—26)

1

This invention relates to a new and improved clutch trip mechanism.

Hay balers, and including pick-up hay balers, are adapted to compress quantities of hay into bale formation and thereafter effect a tying of the compressed hay in its bale formation. A reciprocating plunger is one means of accomplishing hay compression. Hay is fed to the bale forming chamber and continually compressed by the reciprocating plunger until such time as a bale of some predetermined length is completed whereafter a clutch mechanism is tripped and the bale strand encircling mechanism and tying or twisting mechanism is put into operation. The present invention relates to a clutch trip mechanism for accomplishing the functions just described. It should, of course, be understood that the clutch trip mechanism of this invention is not limited to use on hay balers.

An important object of this invention is to provide a clutch for hay balers for energizing the bale tie mechanisms.

Another and further important object of this invention is to provide a double acting trip mechanism for clutches.

A still further important object of this invention is to supply a one revolution driving clutch for the tying mechanisms of hay balers which will actuate through a full revolution without danger of stopping.

Other and further important objects of this invention will become apparent from the disclosures in the following specification and accompanying drawings.

Figure 1:
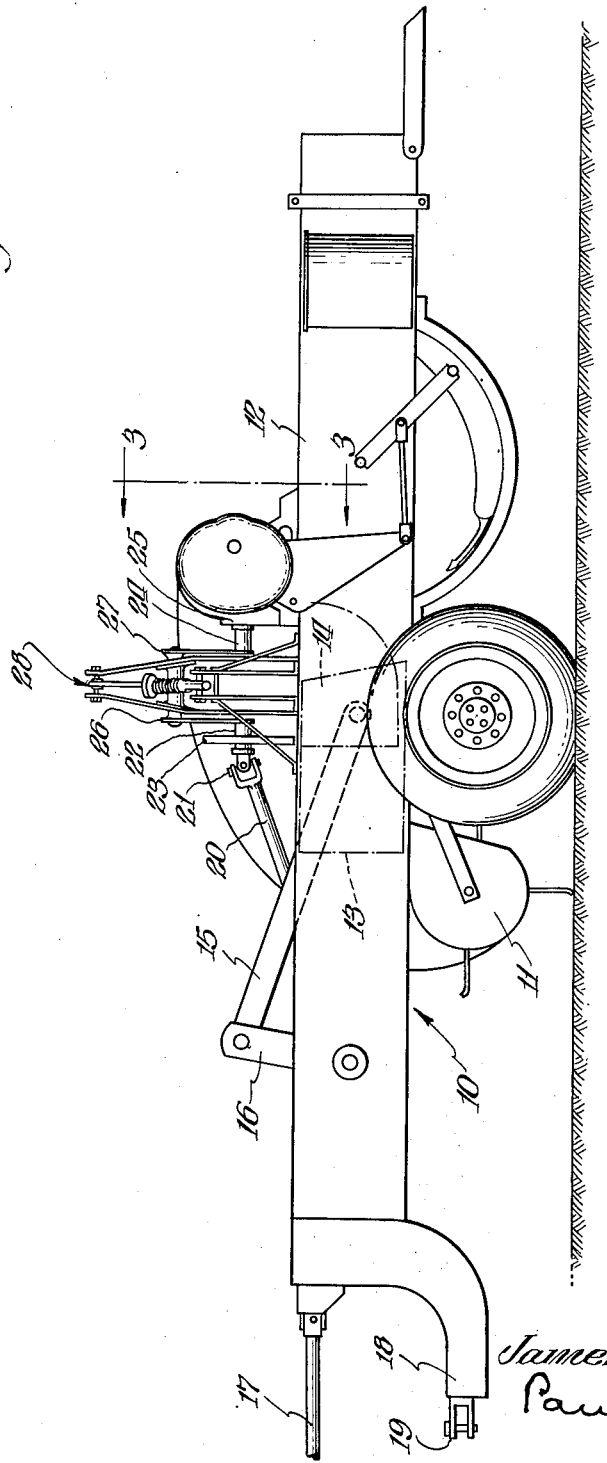
Fig. 1 is a side view of a pick-up hay baler employing the clutch trip mechanism of this invention.

The reference numeral 10 indicates generally a pick-up hay baler having a side mounted pick-up 11 and a longitudinally extending bale forming chamber 12. The bale forming chamber 12 is provided with an opening 13 in a vertical side lying adjacent the side mounted pick-up 11 whereby hay or other material gathered by the pick-up will be delivered into the bale forming chamber 12 through the opening 13. The operation of the side-mounted pick-up is shown in Crumb et al. Patent 2,450,082 dated September 28, 1948. A bale compressing plunger 14 is adapted to reciprocate longitudinally within the chamber 12 in a manner to compress hay fed through the vertical side opening 13.

The plunger 14 is actuated by means of a connecting rod 15 driven by a crank 16. A power take-off shaft 17 projects rearwardly from a tractor (not shown) and is adapted to supply power for the baler operating mechanisms. A hitch structure 18 having a clevis 19 at the forward end is adapted for connection to a tractor draw-bar not shown. Means is provided intermediate the power take-off shaft 17 and the crank 16 for effecting drive therebetween. This is shown in detail in the Kaupke et al. Patent 2,517,439 issued August 1, 1950. A drive shaft 20 is similarly driven through the medium of the tractor power take-off shaft 17. The upper end of the drive shaft 20 joins with a universal joint 21 to effect driving rotation of the inclined drive shaft 20 to the horizontally disposed shaft 22. The shaft 22 is journally carried in a support 23. A shaft 24 is axially aligned with the shaft 22 and spaced therefrom and is carried in a supporting structure 25 which constitutes a journal support therefor. A crank arm 26 is fastened to the shaft 22 and similarly a crank arm 27 is fastened to the shaft 24. A hay packer mechanism 28 is adapted to be driven by the parallel crank arms 26 and 27 to carry hay from the side pick-up 11 through the opening 13 into the longitudinally extending bale forming chamber 12.

Figure 2:
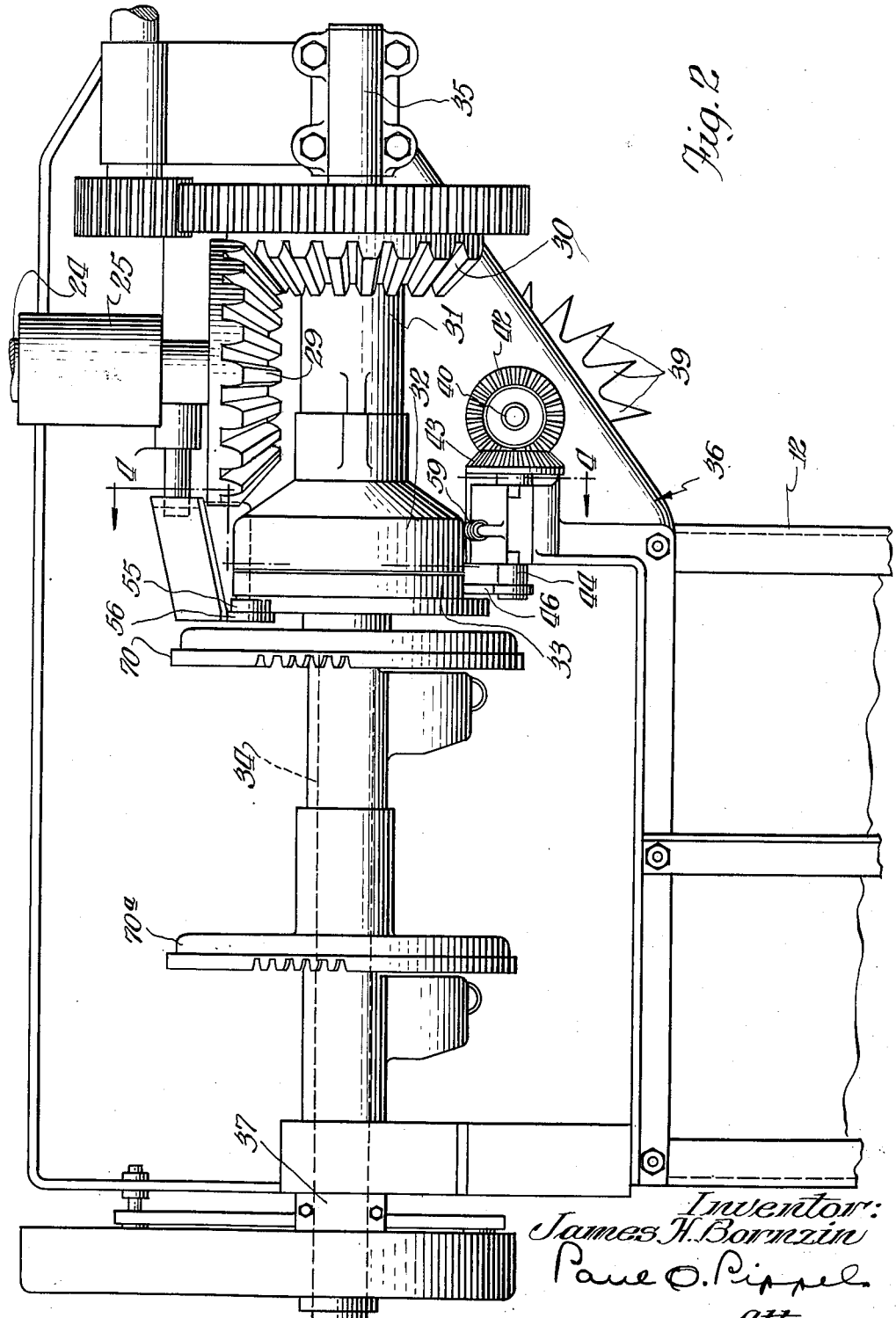
Fig. 2 is a top plan view of a portion of the hay baler as shown in Fig. 1.

As best shown in Fig. 2, a bevel gear 29 is mounted on the other end of the shaft 24 opposite the crank arm 27. A bevel gear 30 meshes with the gear 29 and is disposed at right angles thereto. A sleeve hub 31 constitutes a fixed part of the bevel gear 30. An enlarged bell-shaped housing 32 is fastened for rotation with the sleeve 31. The bell housing 32 serves as the driving part of the clutch of this invention. A cooperative driven clutch part 33 is carried on a shaft 34. The shaft 34 is concentric with and passes through the sleeve 31 and is journaled in a bearing 35 at one end. The entire mechanism is mounted on a supporting structure 36 carried on top of the bale forming chamber 12. A bearing 37 is adapted to journally receive the other end of the shaft 34.

Figure 3:
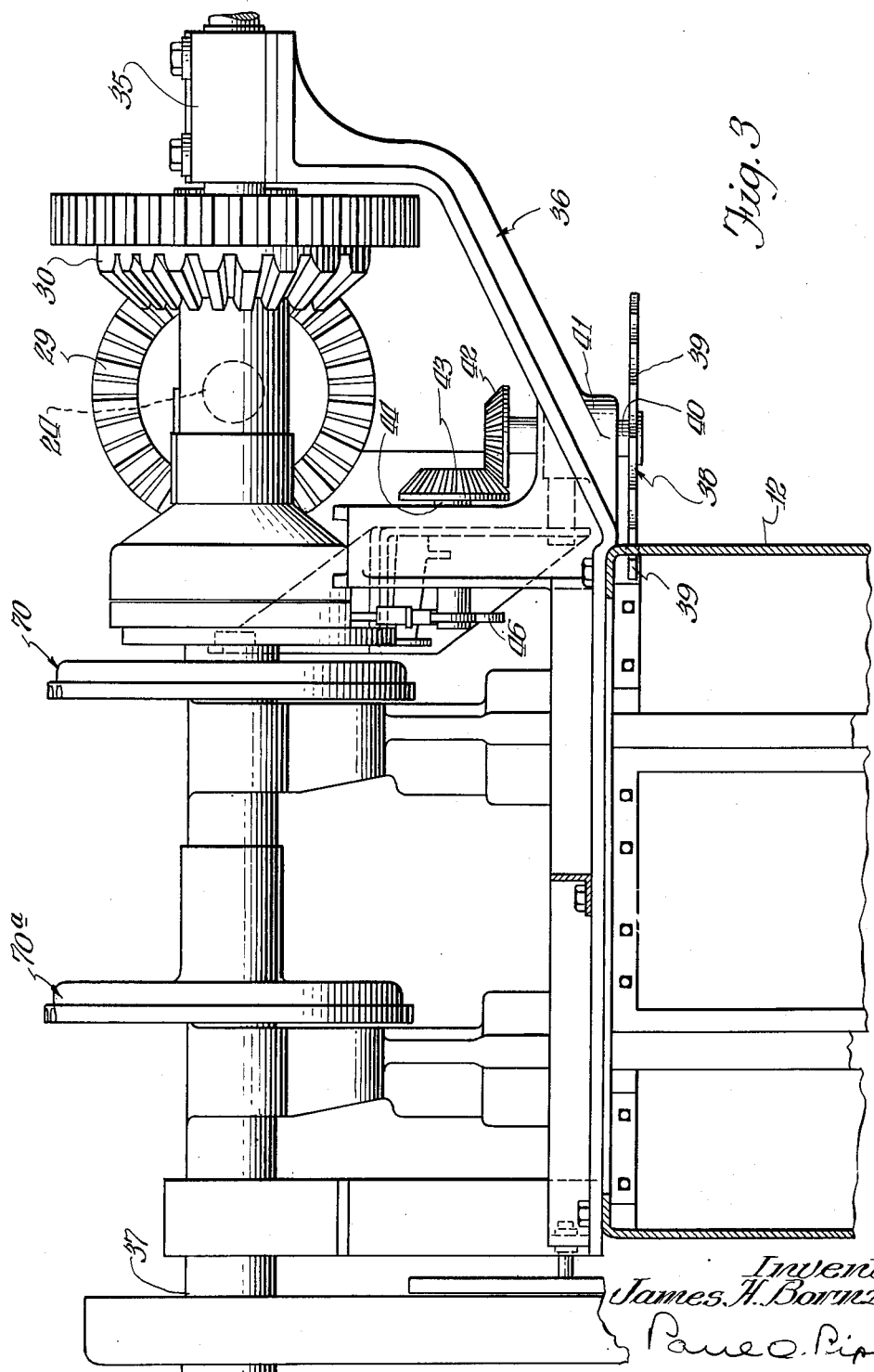
Fig. 3 is a sectional view taken on the line 3—3 of Fig. 1.
Figure 4:
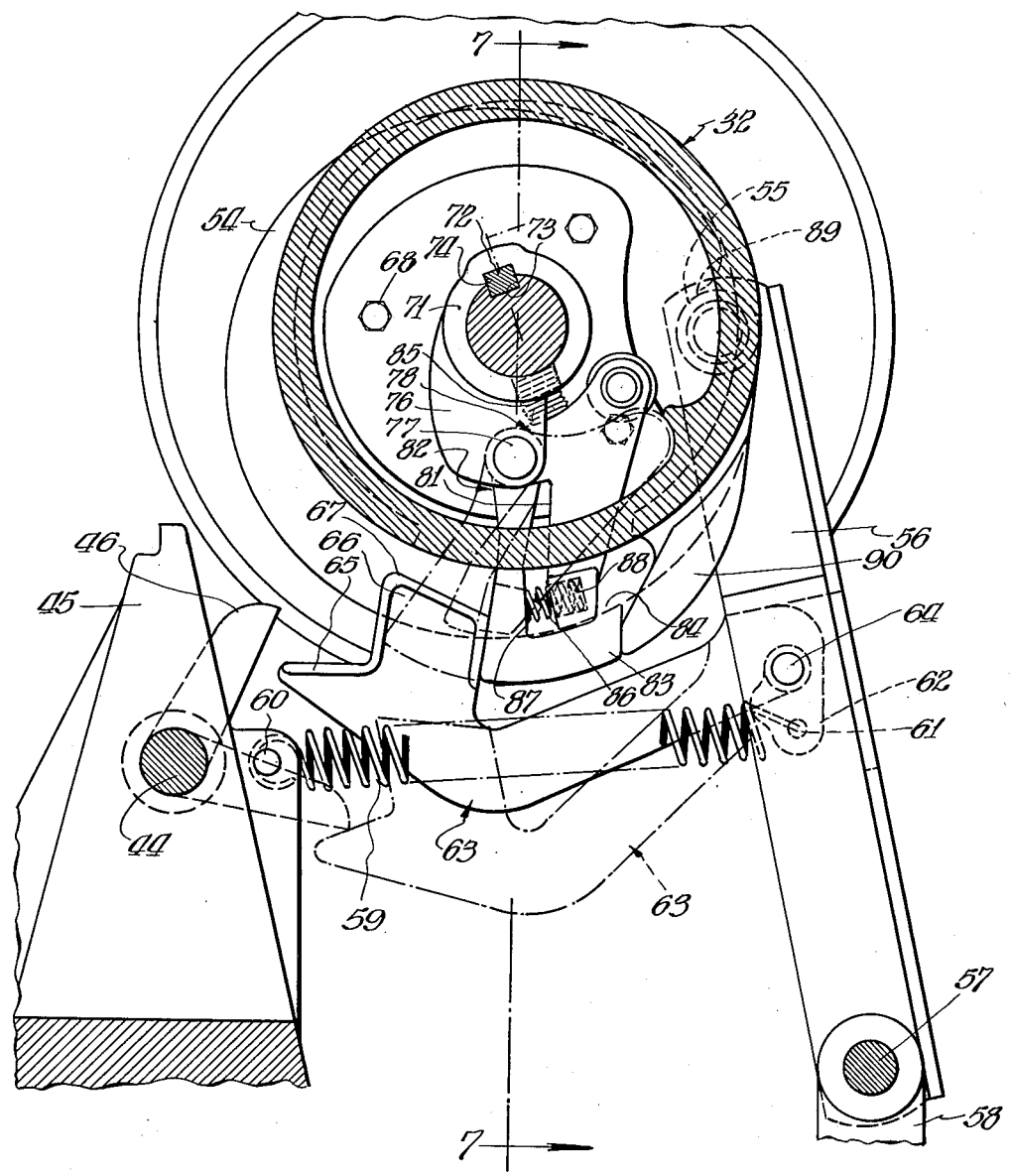
Fig. 4 is a sectional view taken on the line 4—4 of Fig. 2.

In the function of the device as a pick-up hay baler, hay is delivered to the longitudinally extending bale forming chamber 12 through the opening 13 whereupon it is moved rearwardly of the direction of travel of the implement by means of the plunger 14. The hay is thus compressed into bale formation and as it is moved rearwardly in the bale chamber it causes rotation of a star wheel 38 by reason of the projection of the tooth-like extensions 39 of the star wheel into the bale chamber 12 as shown in Figs. 2 and 3. Thus as the hay is moved past the star wheel it causes rotation of the wheel and thus also the wheel shaft 40 which is vertically disposed as shown in Fig. 3. The shaft 40 is journally carried in a boss 41 forming a part of the supporting structure 36. The upper end of the shaft 40 carries a bevel gear 42 which engages a bevel gear 43 disposed at right angles thereto. The bevel gear 43 is mounted on one end of a shaft 44 which is journally supported in a vertical post or the like 45 of the supporting structure 36. The other end of the shaft 44 carries an actuating trip finger 46 as best shown in Fig. 4. It is thus apparent that as the star wheel 38 rotates, actuating trip finger 46 similarly rotates.

Figure 5:
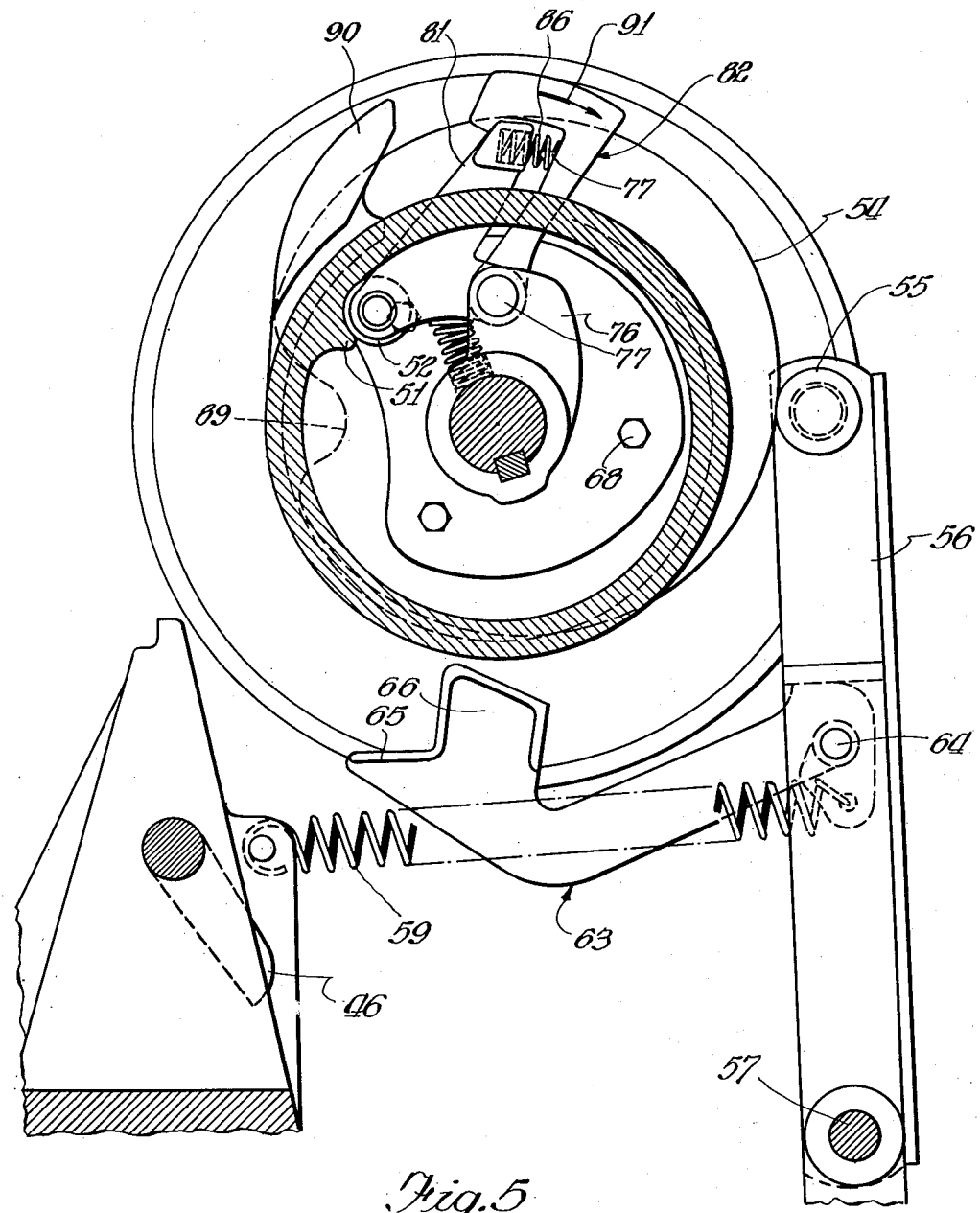
Fig. 5 is a sectional view similar to Fig. 4 with the clutch operating mechanisms in shifted position.
Figure 7:
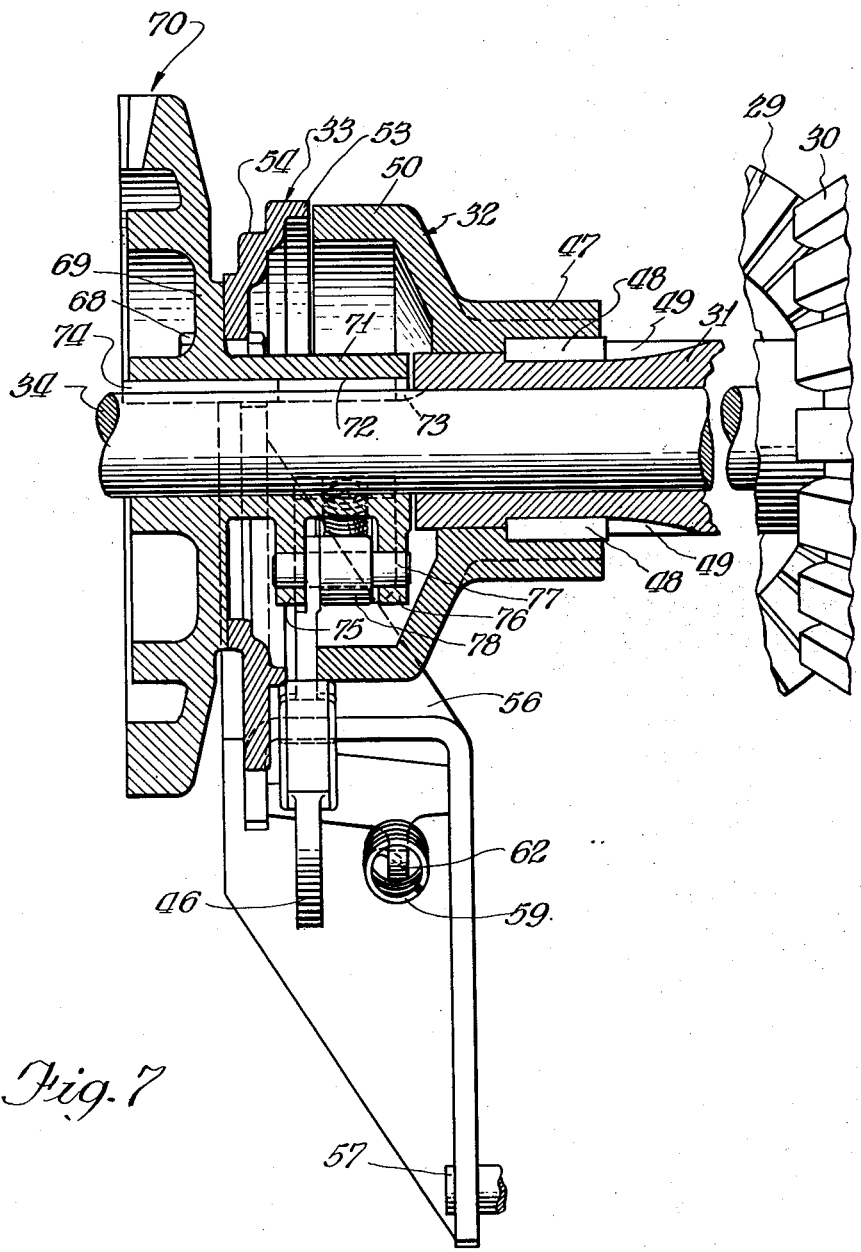
Fig. 7 is a sectional view taken on the line 7—7 of Fig. 4.

As best shown in Figs. 4 and 7, the bell housing 32 is provided with a sleeve hub 47 adapted to receive key members 48 internally thereof for engagement with opposed key slots 49 in the sleeve 31. It is thus apparent that rotation of the sleeve 31 will cause concurrent rotation of the bell housing 32. When the baler is in operation the bell housing 32 is continuously rotating and it is the function of the clutch of this invention to impart rotational drive at predetermined intervals to the centrally located shaft 34 upon which the clutch part 33 is mounted. The bell housing 32 is provided with an annular drum portion 50, the inner side of which carries an internal projection 51, as best shown in Fig. 5, which is arcuate on its sides to permit snug driving engagement with a roller member 52. The roller member 52 is carried on the other clutch part 33 and thus the rotation of the clutch part 32 is imparted to the clutch part 33 through the medium of the driving lug 51 and the driven roller 52.

As best shown in Fig. 7, the clutch part 33 is provided with an annular flange 53 which terminates closely adjacent the flange or drum portion 50 of the bell housing 32 thus minimizing the opening through which dirt or other foreign matter may pass into the working parts of the clutch. Adjacent the flange 53 is an annular cam track or surface 54 which is adapted to receive a cam follower roller 55 carried on a cam follower arm 56 hingedly mounted at 57 on a portion 58 of the supporting structure 36. A spring 59 is anchored at 60 on the post 45 adjacent the actuating finger 46 and at its other end is fastened at 61 to a downwardly depending arm 62 of a trip release lever 63. The trip release lever being bell-crank in shape with angularly disposed arms is hinged at 64 to the cam follower arm 56. It is thus apparent that the spring 59 performs the dual function of holding the cam follower roller 55 on the cam track 54 by a pulling force on the arm 56 and simultaneously urges the trip release lever upwardly in a clockwise direction movement as viewed in Fig. 4.

The trip release lever 63 with its downwardly depending spring engaging arm 62 constitutes a bell-crank which pivots about the mounting 64 on the arm 56.

The trip release lever 63 is provided at its outer end with a broad ledge 65 against which the trip finger 46 is adapted to engage. A keeper member 66 in the form of an upwardly extending projection on the trip release lever 63 is provided with a relatively wide surface 67 around the periphery thereof. The keeper 66 in its uppermost position prevents rotation of the clutch part 33 until such time as the trip release lever is moved downwardly by the trip finger 46 against the action of the spring 59. It should be recalled that the trip finger 46 is rotated directly by rotation of the star wheel 38 which is rotated in direct response to the hay as it is compressed.

As best shown in Fig. 7, the cam part 33 is bolted as shown at 68 to the disk portion 69 of a relatively large diameter mutilated bevel gear 70. The bevel gear 70 is adapted to actuate the tying or twisting mechanisms (not shown), which cause a tying of the bale encircling strand employed in the baler of this invention. The tying mechanism is shown in detail in the patent to Raney 2,403,396 dated July 2, 1946. The bevel gear 70 thus rotates concurrently with the intermittent rotation of the cam part 33. A hub portion 71 is provided for the combination clutch part 33 and gear 70. The hub 71 constitutes a sleeve which is carried directly on the shaft 34. A key 72 is positioned intermediate the shaft 34 and hub 71. The key 72 lies in a keyway slot 73 in the shaft 34 and within an opposing slot 74 in the sleeve hub 71. A pair of spaced lugs 75 and 76 are formed integrally with the hub 71 at a position within the drum 50 of the bell housing part 32. The spaced apart aligned lugs 75 and 76 carry a transversely disposed shaft 77 on which is mounted a bell-crank or T-shaped trip dog 78. The trip dog 78 has a first arm 79, the outer end of which carries the driven roller 52 on a shaft 80. A second arm 81 extends radially outwardly from a position substantially intermediate the ends of the arm 79 and is offset laterally from the arm 79 in order to clear the drum of the bell housing 32. A separate auxiliary trip dog lever member 82 is similarly hinged on the pivotal mounting 77 along with the trip dog 78. The lower end of the auxiliary trip dog lever 82 is provided with an arcuate laterally extending tail member 83 having an inwardly extending lug or stop member 84 at the outer end thereof opposite the downwardly depending lever 22. A spring 85 normally exerts an outward and clockwise rotational force against the arm 79 as viewed in Fig. 4, causing the depending arm 81 to be moved toward the depending lever arm 82. The arm 81 is disposed between the lever 82 and the lug or stop member 84 of the tail 83.

A spring 86 is held in position between the lever arm 82 and the arm 81 by a projection 87 on the lever arm 82 at one end and at its other end by engagement with a socket 88 in the lower end of the arm 81. The stop 84 on the end of the tail 83, as previously stated, confines rearward movement of the depending arm 81. The spring 86 normally maintains the arms 82 and 81 spaced apart. When the trip release lever is moved to its dashed line position as shown in Fig. 4, the trip dog is permitted to swing downwardly so that the roller 52 nests within the arcuate driving surface of the inwardly projecting lug 51 of the bell housing 32. The continuous rotation of the bell housing 32 now is adapted to impart rotation to the driven roller 52 and thus also to the spaced arm lugs 75 and 76 which carry the pivotal shaft mounting 77 for the trip dog. Inasmuch as the lugs 75 and 76 are integral with the sleeve hub 71 of the combination clutch part 33 and bevel gear 70, there is now existing concurrent rotation of the clutch parts 32 and 33 along with the mutilated bevel gear 70. The lever arm 82 directly engages the keeper 66 on the trip release lever 63. Thus when the lever 63 is moved downwardly to the position shown in the dashed lines of Fig. 4, the lever 82 is permitted to swing to its dashed line position whereupon the spring 85 exerts its clockwise rotational force to the arm 79 thus causing the roller 52 to move downwardly into driven engagement with the inward projection 51 as just described.

The cam surface 54 is arranged to cause an inward and outward shifting or swinging of the cam follower arm 56. The cam follower roller 55 engages a notch 89 in the cam track 54. The notch 89 is a relatively large depression within the cam track, thus permitting the hinged follower arm 56 to move to its extreme leftward position as shown in Fig. 4. When the trip release lever 63 is moved downwardly by reason of the trip finger 46, the cam track is driven through the medium of the driving projection 51 and the driven roller 52. The shape of the remainder of the cam track 54 is such that the follower arm 56 will be swung in a rightward direction as viewed in Fig. 4, causing the trip release lever 63 to similarly move over whereupon the keeper member 66 will be in position to receive and halt free movement of the lever member 82. A stop or projection member 90 is provided on the side of the cam track 54 and in the last stages of the clutch operation engages the lateral end of the tail 83 adjacent the upward projection 84.

In the operation of the device the trip release lever 63 is initially moved downwardly by reason of the trip finger 46 engaging and pushing downwardly on the ledge 65 forming a forward extension of the release lever 63. The upwardly projecting keeper 66 is thus moved downwardly out from the path of the auxiliary trip dog lever arm 82 permitting free movement of the lever arm 82 and also the trip dog 78. This freedom of movement causes the roller 42 to be moved radially outwardly within the bell housing drum 50 whereupon it is engaged by the inwardly extending projection 51 of the constantly driven bell housing 32. Drive is now imparted from the driving clutch part 32 to the driven clutch part 33 whereupon the entire mechanism is driven as a unit. Still further, the mutilated bevel gear 70 is driven as are all the other elements on the shaft 34. A second mutilated bevel gear 70a is spaced from the first gear and is keyed to the shaft 34 and constitutes the means for driving a second strand tying means, not shown in detail in this patent application but as previously stated is set forth in detail in the Raney Patent 2,403,396.

As shown in Fig. 5, the follower arm 56 and its roller 55 have moved outwardly on the cam surface 54 to such an extent that the outer end 65 of the trip release lever 63 has cleared the trip finger 46, thus permitting uninterrupted movement of the trip finger 46 without the impediment of having to act against the spring 59. The driving projection 51 of the bell housing 32 is in engagement with roller 52 to be driven and as shown the lever member 82 is moving in a clockwise direction as viewed in Fig. 5 and indicated by the arrow 91. The spring 86 maintains this lever 82 spaced forwardly from the radially extending leg 81 of the trip dog 78.

Figure 6:
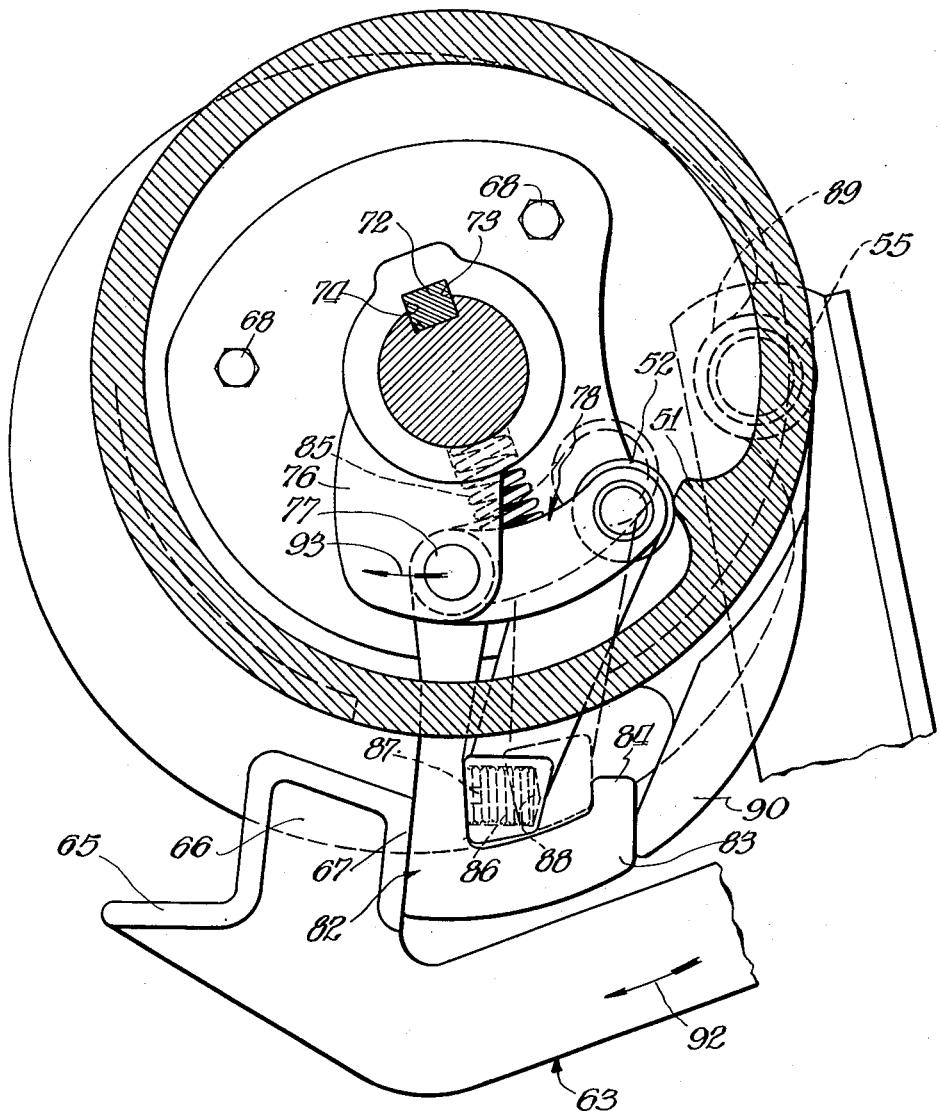
Fig. 6 is still another sectional view similar to Figs. 4 and 5 with the clutch operating mechanisms rotated to still a further position.

In Fig. 6 the trip mechanism is substantially back to its home position wherein the lever 82 has come into abutting relationship with the broad surface 67 of the keeper 66 of the trip release lever 63. The trip release lever 63 is free to move laterally in the direction indicated by the arrow 92 by reason of the cam follower roller 55 engaging the cam surface notch 89. This provides a yielding cushioned stop for the device and contributes to long life of the clutch parts. During this last movement of the clutch part 33 the spring 86 is fully compressed by reason of the holding of the lever 82 and the continued driving of the roller 52 by the driving lug 51. When the trip release lever 63 does in fact stop this movement in the direction indicated by the arrow 92 there is a solid stop for the lever 82, but as previously stated there is a continued drive of the trip dog 78 through the roller 52. There is thus a movement about the shaft 77 in a direction indicated by the arrow 93 and simultaneously the compression of the spring 86. It is this shifting of the pivotal center of the trip dog 78 and the lever 82 that causes an automatic rising of the roller 52 out of engagement with the driving lug 51 of the clutch part 32. In order that there shall be no hesitancy regarding the disengagement of the driving and driven members 51 and 52, the spring 86 is permitted to and does actuate at that point in the operation wherein the parts are indicated in full lines in Fig. 6, whereupon the extension of the spring 86 causes a sudden pushing of the roller 52 from its last engagement with the driving lug 51. This is shown in the dashed line position of the parts in Fig. 6. Rotational movement of the cam 54 and thus also the entire clutch part 33 is halted by the engagement of the stop 90 with the outer end of the tail 83 of the lever 82. Disengagement of the trip dog from the driving projection takes place when the trip release lever 63 moves the trip dog 78 to a point where the driving projection 51 is just below the center line of force of the driven roller 52. The spring 86 then continues to move the driven roller 52 away from the driving lug 51, thereby preventing interference with each rotation.

It will be seen that herein has been provided a double-acting trip mechanism for clutch operation for hay balers wherein there is a positive and quick acting release of the driven member from the driving member and wherein the single revolution clutch is capable of driving the shaft to be driven throughout a full revolution without relying upon momentum, weight from gravity, or spring mounted roller on cam track to drive this driven shaft through its last few degrees of rotation.

Numerous details of construction may be varied throughout a wide range without departing from the principles disclosed herein, and I therefore do not propose limiting the patent granted hereon otherwise than as necessitated by the appended claims.

What is claimed is:

1. A clutch mechanism comprising a supporting structure, a driving part and a driven part, both carried on said supporting structure, a driving projection on said driving part, a trip mechanism on said driven part, said trip mechanism comprising a trip dog engageable in one position by said driving projection, said trip dog hinged on said driven part and having an outwardly extending arm, an auxiliary trip dog lever hinged with said trip dog on said driven part and having an outwardly projecting portion, a spring positioned intermediate the outwardly extending arm of said trip dog and said lever and arranged and constructed to normally maintain the arm and lever in spaced apart position, a trip release lever carried on said supporting structure separately from said driving and driven parts, said trip release lever engageable by the outwardly projecting portion of said auxiliary trip dog lever for the purpose of stopping movement of said auxiliary trip dog lever, whereby the spring is compressed by the outwardly extending arm of the trip dog moving to abutting relationship with the outer end of said auxiliary trip dog whereupon the hinge on said driven part being rotatably driven causes a tiltable swinging of the trip mechanism as a unit and a major removal of the trip dog from the driving projection whereafter the intermediate spring causes a final push out of the trip dog from its last minor portion of engagement by the driving projection.

2. A clutch mechanism comprising a supporting structure, a driving part journally mounted on said supporting structure, said driving part having a drum portion, said drum portion having an inwardly extending driving projection, a driven part journally mounted on said supporting structure, said driven part including a sleeve located within and concentric to said drum portion, a lug integral with and extending radially from said sleeve, a trip dog hingedly mounted on said lug, said trip dog including a first arm adapted in one position thereof for engagement by said driving projection, a second arm on said trip dog offset from said first arm extending radially outwardly, and spring means normally urging said trip dog into engagement with said driving projection, an auxiliary trip dog hingedly mounted on said lug on the same axis of rotation with said trip dog, said auxiliary trip dog including an outwardly extending arm, a tail extending laterally from the outer end of said outwardly extending arm, an inwardly extending stop lug on said tail spaced from said outwardly extending arm, said second arm of the trip dog disposed between the outwardly extending arm of the auxiliary trip dog and the inwardly extending stop lug of the tail, a spring disposed between the outwardly extending arm of the auxiliary trip dog and the second arm of the trip dog, and a trip release mechanism.

3. A clutch mechanism as set forth in claim 2 in which the trip release mechanism includes an arm hingedly mounted on said supporting structure, a trip lever, and a second spring means joining the hingedly mounted arm and said supporting structure normally urging the hingedly mounted arm in one direction and the trip lever into position adjacent to and providing a stop for the outwardly extending arm of the auxiliary trip dog.

4. A clutch mechanism as set forth in claim 3 in which the trip release mechanism further includes an annular cam track around said driven clutch part, a cam follower roller on the end of said hingedly mounted arm, and said spring means maintaining said cam follower roller against the annular cam track, said annular cam track having a configuration to cause the hingedly mounted arm to swing toward and away from said clutch mechanism and thus simultaneously to cause the trip lever to shift and thus reposition the stop for the outwardly extending arm of the auxiliary trip dog.

5. A clutch mechanism as set forth in claim 4 in which a trip finger is provided to move the trip lever against the action of said second spring means and out of stop position adjacent the outwardly extending arm of the auxiliary trip dog.

6. A clutch mechanism as set forth in claim 5 in which a stop member is provided on the side of the cam track arranged and constructed to abut the tail of the auxiliary trip dog at the completion of the cycle of operation.

7. A clutch mechanism as set forth in claim 6 in which the trip lever is bell-crank in shape having angularly spaced arms and said second spring means is fastened to the outer end of one of the angularly spaced arms.

8. A clutch mechanism as set forth in claim 7 in which the trip lever is provided with a broadened surface at the outer end of the other angularly spaced arm for engagement by said trip finger.

9. A clutch mechanism as set forth in claim 2 in which the trip release mechanism includes a spring retained trip lever.

JAMES H. BORNZIN.

References Cited in the file of this patent

UNITED STATES PATENTS

| Number | Name | Date |
|---|---|---|
| 689,865 | Hill et al. | Dec. 31, 1901 |
| 2,523,890 | Vutz | Sept. 26, 1950 |